G. H. Spencer,
Medicine Spoon.

No. 107,419  Patented Sep. 13, 1870.

Witnesses:
Albert H. Morris
Jefferson Clark

G. H. Spencer
By his attys.
Howson & Son

United States Patent Office.

GEORGE H. SPENCER, OF CLEVELAND, OHIO, ASSIGNOR TO HIMSELF AND JOSHUA B. GLENN, OF SAME PLACE.

Letters Patent No. 107,419, dated September 13, 1870.

IMPROVEMENT IN SPOONS.

The Schedule referred to in these Letters Patent and making part of the same

I, GEORGE H. SPENCER, of Cleveland, county of Cuyahoga, State of Ohio, have invented an Improved Spoon, of which the following is a specification.

Nature and Object of the Invention.

My invention consists in the combination, with a spoon, of a nipple arranged on the bowl, so that the contents of the latter may be drawn through the said nipple; and The invention further consists of a spoon, constructed as fully described hereafter, so as to contain a larger quantity of fluid than a spoon of the ordinary construction.

Description of Accompanying Drawing.

Figure 1:
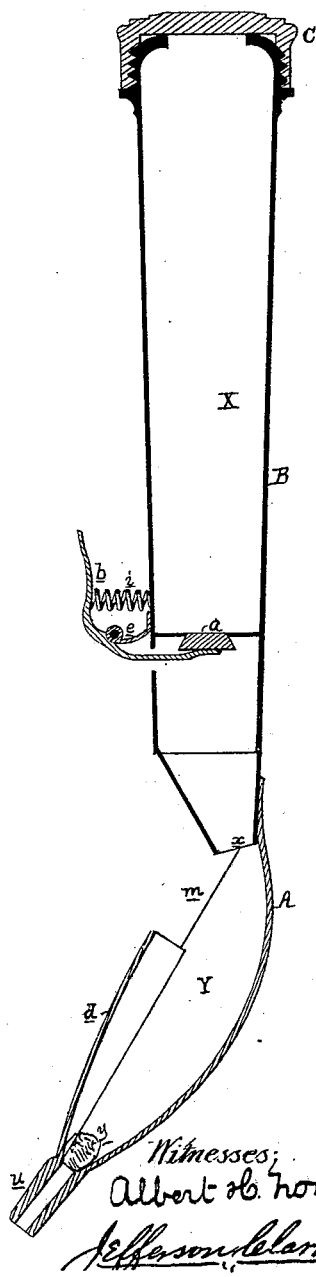
Figure 2:
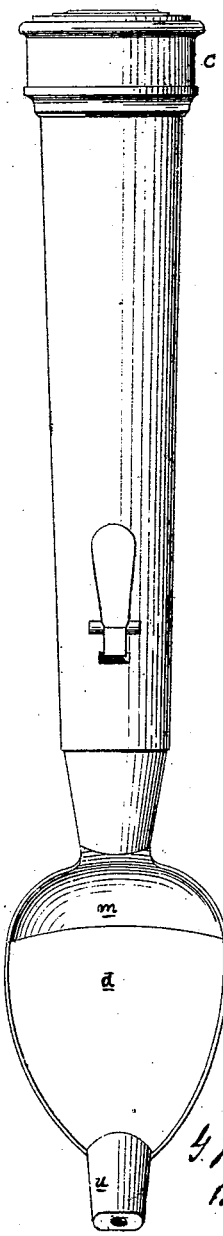

Figure 1 is a longitudinal section of my improved spoon; and
Figure 2, a plan view.

General Description.

A is the bowl, and B the handle of the spoon, the handle in the present instance, being cylindrical in shape, and containing a chamber, X, which is contracted at the lower end, $x$, above the rear end of the bowl.

The upper end of the hollow handle is closed by a screw-cap, C, and within the chamber X, near the lower end, is a seat for a valve, $a$, which is connected to a lever, $b$, hung to a projection, $c$, on the handle, a spring, $i$, pressing against the under side of the lever, and tending to maintain the valve in contact with its seat.

A plate, $d$, is secured to the edges, and covers the bowl of the spoon from the tip or lower end to a point adjacent to the handle, forming a chamber, Y, but leaving an uncovered portion or opening, $m$, and from the tip projects a contracted hollow nipple, $n$, which may be formed by prolonging the tip of the spoon or by soldering a tube to the latter.

The above-described spoon, while it may be usefully employed as a substitute for an ordinary spoon in many cases, is especially serviceable in administering food or medicine to infants, inasmuch as the nipple $n$ can be readily retained in the mouth, and held so as to permit the child to draw the contents from the bowl, and thus obtain the fluid in a more maternal manner than when it is poured directly into the mouth, while the plate $d$ will effectually prevent the fluid (which is discharged from the reservoir X by raising the valve $a$) from flowing from the bowl.

In many instances the reservoir X may be dispensed with, as the chamber Y may be filled through the opening $m$, and will frequently retain as much fluid as is necessary to be administered at one time; and, if desired, a sponge, $y$, may be placed in the bowl adjacent to the nipple, to prevent too ready a discharge of the contents.

If desired, an ordinary bowl may be used in connection with the hollow handle and its valve, the latter being raised when the bowl is in such a position as to conduct the fluid (after it flows from the reservoir) to the mouth.

It will be apparent that the nipple $n$ may be arranged at the tip without necessarily employing the plate $d$, and that the nipple may be arranged at one side of the spoon, instead of at the tip.

Claims.

1. The combination, with a spoon, of a nipple, $n$, substantially as set forth.
2. The combination, with the bowl A, of the said nipple $n$, plate $d$, and opening $m$, as described.
3. The combination of the bowl A, handle B, its reservoir X, contracted mouth $x$, and valve $a$, substantially as specified.
4. The sponge $y$, arranged in the bowl of the spoon beneath the plate $d$, and adjacent to the nipple $n$, as described.

In testimony whereof I have signed my name to this specification in the presence of two subscribing witnesses.

GEORGE H. SPENCER.

Witnesses:
CHARLES E. FOSTER,
T. C. CONNOLLY.